(12) United States Patent
Bang

(10) Patent No.: US 11,385,079 B2
(45) Date of Patent: Jul. 12, 2022

(54) METHOD AND APPARATUS FOR OBTAINING VALID PEAK OF SIGNAL OF RESOLVER SENSOR

(71) Applicant: HYUNDAI MOBIS CO., LTD., Seoul (KR)

(72) Inventor: Sung-Hoon Bang, Goyang-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/913,942

(22) Filed: Jun. 26, 2020

(65) Prior Publication Data

US 2021/0003424 A1 Jan. 7, 2021

(30) Foreign Application Priority Data

Jul. 2, 2019 (KR) .................. 10-2019-0079488

(51) Int. Cl.
*G01D 5/243* (2006.01)

(52) U.S. Cl.
CPC .................. *G01D 5/243* (2013.01)

(58) Field of Classification Search
CPC ........... G01D 5/243; G01D 3/08; G01D 3/02; G01D 5/204; H02P 23/14; G01R 19/04
USPC .................................... 324/207.12
See application file for complete search history.

(56) References Cited

U.S. PATENT DOCUMENTS

| | | | |
|---|---|---|---|
| 2006/0215797 | A1 | 9/2006 | Takeuchi |
| 2011/0181292 | A1* | 7/2011 | Oowada ................ G01R 35/00 |
| | | | 324/537 |
| 2018/0073895 | A1* | 3/2018 | Chellamuthu ........... G01D 3/08 |

FOREIGN PATENT DOCUMENTS

| | | |
|---|---|---|
| DE | 102019203612 A1 | 9/2019 |
| JP | 2004-0045286 A | 2/2004 |
| JP | 2007315856 A | 12/2007 |
| JP | 2011-0099828 A | 5/2011 |
| JP | 2015-135283 A | 7/2015 |
| JP | 2017-0151032 A | 8/2017 |
| JP | 2019-0135893 A | 8/2019 |
| KR | 10-1338707 B | 12/2013 |
| KR | 10-1406081 B1 | 6/2014 |
| KR | 10-2019384 B | 9/2019 |

OTHER PUBLICATIONS

German Office Action for German Application No. 10 2020 208 031.3 dated Feb. 11, 2021 (11 pgs).

* cited by examiner

*Primary Examiner* — Farhana A Hoque
(74) *Attorney, Agent, or Firm* — Morgan, Lewis & Bockius LLP

(57) ABSTRACT

A method and apparatus for obtaining a valid peak from an output signal of a resolver sensor are provided. The method includes inputting an excitation signal to a resolver sensor, receiving a resolver signal from the resolver sensor, receiving a high peak and a low peak from the received resolver signal, determining whether the high peak or the low peak falls within an effective range, and defining the high peak or the low peak as a valid peak when the high peak or the low peak falls within the effective range.

9 Claims, 5 Drawing Sheets

METHOD AND APPARATUS FOR OBTAINING VALID PEAK OF SIGNAL OF RESOLVER SENSOR

CROSS-REFERENCE TO RELATED APPLICATION

The present application claims priority to and the benefit of Korean Patent Application No. 10-2019-0079488, filed Jul. 2, 2019, the entire contents of which is incorporated herein for all purposes by this reference.

TECHNICAL FIELD

The present disclosure relates to a method and apparatus for obtaining a valid peak of an output signal of a resolver sensor.

BACKGROUND

The statements in this section merely provide background information related to the present disclosure and may not constitute prior art.

A resolver sensor refers to a sensor for measuring the angular position of a rotor in a motor. Since resolver sensors have a higher mechanical strength and durability than encoders, they are used as position sensors for motors in applications, such as automobiles, where high performance and high precision driving are required. That is, resolvers are used to measure the angle of rotation of a rotating device such as a motor or an engine. In applications such as motor driven-systems that require frequent speed changes or precise position control, a resolver sensor is used to detect a rotor position.

To perform precise position control with the help of a resolver sensor, compensation for a delay of a signal (hereinafter, referred to as resolver signal) received from the resolver sensor is essential. A delay is likely to occur between an input signal applied to a resolver sensor and an output signal (resolver signal) of the resolver sensor due to many reasons. If proper compensation is not performed for the delay, the correct position of a rotor cannot be determined, and thus precise control of the motor cannot be achieved.

The present disclosure is intended to accurately measure the degree of a delay of a resolver signal. More specifically, the present disclosure aims at meeting the need for a new methodology capable of accurately determining an accurate time point of a signal peak and verifying the signal peak.

SUMMARY

The present disclosure provides a method and apparatus for accurately identifying and verifying a signal peak of a resolver signal and a time point of the signal peak.

The present disclosure also provides a solution to a problem of not being able to accurately identify a time point of a signal peak when using a single threshold detection method. The present disclosure provides an environment in which an accurate delay time can be obtained, thereby enabling precise motor control.

In one aspect of the present disclosure, there is provided a method of obtaining a valid peak of an output signal of a resolver sensor, the method including: (a) inputting an excitation signal to a resolver sensor; (b) receiving a resolver signal from the resolver sensor; (c) taking a high peak and a low peak from the received resolver signal; (d) determining whether only one of the high peak and the low peak falls within an effective range; (e) defining either the high peak or the low peak as a valid peak when it is determined that only one of the high peak and the low peak falls within the effective range.

In the method, the step (c) may include taking count values at respective time points when a value of the resolver signal is equal to a first threshold value that is preset; and calculating a first median value between the count values. The step (c) may further include taking count values at respective time points when the value of the resolver signal is equal to a second threshold that is present and is different from the first threshold value; and calculating a second median value between the count values.

In the method, the step (c) may further include defining a value of the resolver signal at a time point corresponding to the first median value and a value of the resolver signal at a time point corresponding to the second median value as the high peak and the low peak, respectively, or vice versa.

In the method, in the step (c), when there is no time point at which the value of the resolver signal is equal to the first threshold value or the second threshold value, the resolver signal that is previously obtained may be invalidated.

In the method, in the step (e), when both of the high peak and the low peak fall within the effective range, both of the high peak and the low peak may be invalidated.

In the method, in the step (d), the effective range may be a phase range of from 90° to 270° of the excitation signal.

In the method, the excitation signal may be a sine wave signal.

According to another aspect of the present disclosure, there is provided a resolver sensor management apparatus including: a signal generator configured to receive a square wave signal from a micro controller unit (MCU), to generate an excitation signal to be input to a resolver sensor; a signal receiver configured to receive a resolver signal from the resolver sensor; and a processor configured to take a peak from the resolver signal and to determine whether to define the peak as a valid peak or not depending on whether the peak falls within an effective range.

According to a further aspect of the present disclosure, there is provided a computer-readable recording medium in which computer instructions to execute a signal peak acquiring method in conjunction with a computing device are stored, the method including: (a) inputting an excitation signal to a resolver sensor; (b) receiving a resolver signal from the resolver sensor; (c) taking a high peak and a low peak from the received resolver signal; (d) determining whether only one of the high peak and the low peak falls within an effective range; (e) defining either the high peak or the low peak as a valid peak when it is determined that only either one of the high peak and the low peak falls within the effective range.

In some forms of the present disclosure, it is possible to accurately identify a time point of a signal peak, thereby enabling precise motor control.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
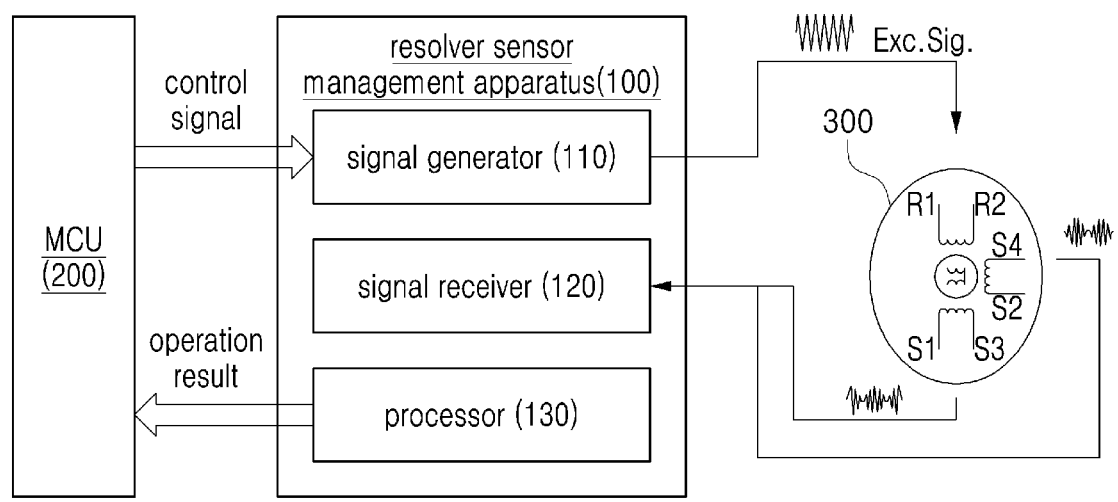
FIG. 1 is a diagram illustrating the construction of a resolver sensor management apparatus in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference now should be made to the drawings, in which the same reference numerals are used throughout the different drawings to designate the same or similar components.

Unless the context clearly defines otherwise, all terms or words (including technical and scientific terms or words) used herein have the same meanings as common meanings understood by those skilled in the art to which the present disclosure pertains.

Terms defined in commonly used dictionaries should not be interpreted overly ideally unless the context clearly defines otherwise. The terminology used herein is for describing the forms and is not intended to limit the present disclosure. As used herein, the singular forms "a", "an", and "the" are intended to include the plural forms as well, unless the context clearly indicates otherwise.

It will be further understood that the terms "comprises" and/or "comprising" when used in this specification specify the presence of stated features, regions, integers, steps, operations, elements and/or components, but do not preclude the presence or addition of one or more other element, regions, integers, steps, operations, elements, components and/or groups thereof.

Hereinafter, some forms of the present disclosure will be described in detail with reference to the accompanying drawings.

FIG. 1 is a diagram illustrating the construction of a resolver sensor management apparatus 100 in some forms of the present disclosure.

Referring to FIG. 1, the resolver sensor management apparatus 100 is largely composed of a signal generator 110, a signal receiver 120, and a processor 130. The apparatus 100 may further include additional components required in some forms of the present disclosure.

The signal generator 110, the signal receiver 120, and the processor 130 are separately named for the purpose of distinguishing the functions performed thereby. In some cases, one of these constituent elements may perform the function of another, or all these constituent elements performing those functions may be implemented as an integrated module.

Each of the constituent elements of the resolver sensor management apparatus 100 will be described in detail below.

First, the signal generator 110 receives a control signal having a square waveform from a micro controller unit (MCU) 200 and generates an excitation signal on the basis of the control signal. It is noted that the excitation signal is a collective term referring to a signal applied to a target object. There may be other terms having the same meaning, for example, a stimulation signal, etc. However, in the detailed description herein, such a signal will be referred to as excitation signal.

The excitation signal generated by the signal generator 110 may be a sine wave signal with a fixed frequency. The signal generator 110 includes a square wave-to-sign wave converter which converts a square wave signal received from the MCU 200 to a sine wave signal that serves as the excitation signal.

The excitation signal generated by the signal generator 110 is input to a resolver sensor 300. The resolver sensor 300 is an analog angle detection sensor that converts a mechanical angular displacement of a motor into an electrical signal using an electromagnetic induction phenomenon. The resolver sensor 300 modulates the received excitation signal with a stator coil and produces a reflected excitation signal (sine wave signal and/or cosine wave signal).

The MCU 200 controls the overall operation of the entire system including the resolver sensor 300 and the resolver sensor management apparatus 100. Although not illustrated in the drawings, the MCU 200 includes a square wave generator, an analog-to-digital converter, and an operation unit. The square wave generator generates a square wave signal to serve as the control signal, and the analog-to-digital converter converts an analog signal received by the signal receiver 120 into a digital signal. The operation unit receives various types of information from the processor 130 of the resolver sensor management apparatus 100 and calculates a signal compensation value corresponding to a signal delay value.

Next, the signal receiver 120 receives a resolver signal (sine wave and/or cosine wave) from the resolver sensor 300. The resolver sensor 300 modulates and reflects the excitation signal and produces the resolver signal. Therefore, the resolver signal is a signal generated through the modulation and the reflection of the excitation signal.

The processor 130 is a key element in the resolver sensor management apparatus 100. The processor 130 takes a peak from the resolver signal and determines whether to define the peak as a valid peak or to invalidate the peak depending on whether the peak falls within an effective range.

Specifically, the processing operation performed by the processor 130 is divided into a step (i) of taking a high peak and a low peak from the resolver signal, and a step (ii) of determining whether to define the high peak or the low peak as a valid peak or to invalidate the high peak and the low peak depending on whether one of the high peak and the low peak falls within the effective range. The two steps performed by the processor 130 will be further detailed later with reference to FIGS. 2 to 5.

The functions corresponding to the two steps are principle functions of the processor 130. In addition to the principle functions, the processor 130 may further have a function of delivering information obtained during the two steps to the MCU 200. That is, the processor 130 delivers information including a time point at which a valid peak has appeared during and a signal value of the valid peak to the MCU 200 so that the MCU 200 can generate a control signal that reflects a delay time.

The major constituent elements of the resolver sensor management apparatus 100 have been described so far.

However, it is noted that in addition to the signal generator 110, the signal receiver 120, and the processor 130, the resolver sensor management apparatus 100 may further include other elements such as a communication unit. Specifically, the resolver sensor management apparatus 100 surely further includes a communication unit to deliver the outputs of the processor 130 to the MCU 200. For example, the communication unit may transmit information according to a serial peripheral interface (SPI) scheme. However, the communication scheme used by the communication unit may not be limited thereto.

Figure 2:
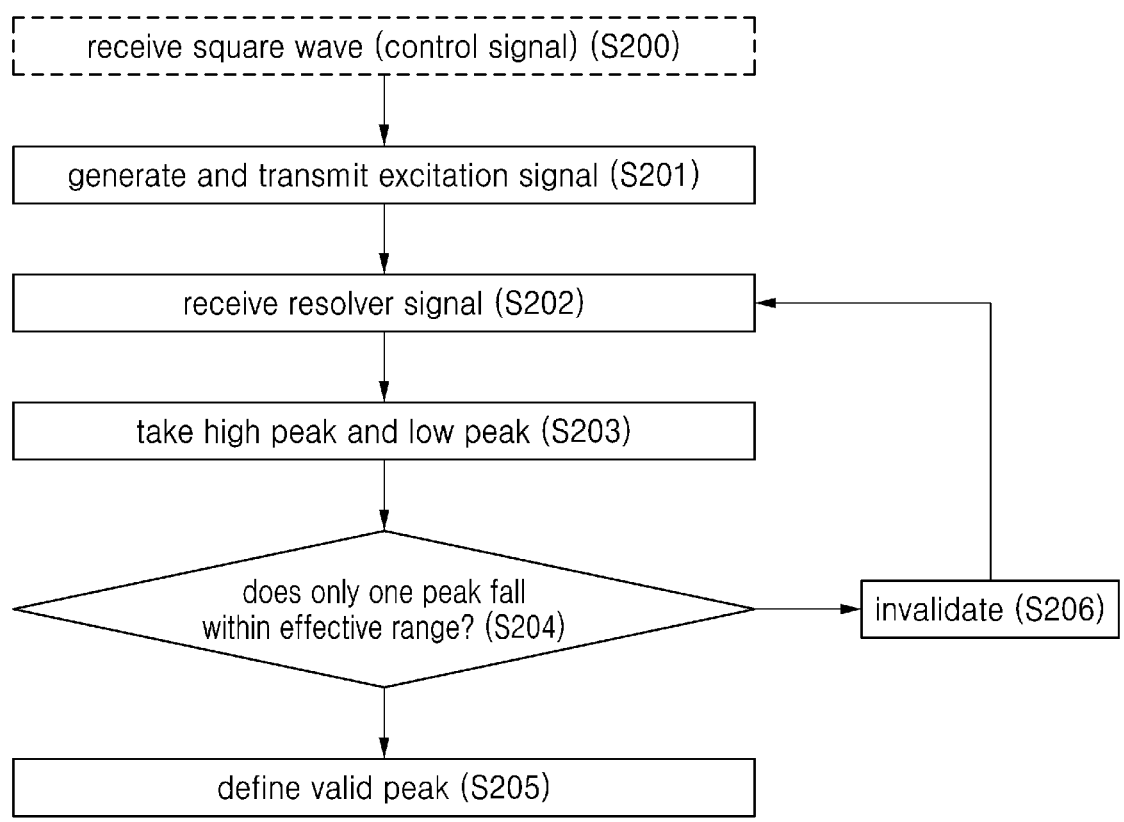
FIG. 2 is a flowchart illustrating a method of obtaining a valid peak of an output signal of a resolver sensor in one form of the present disclosure.

FIG. 2 is a flowchart illustrating a method of obtaining a valid peak of a resolver signal output from a resolver sensor. FIG. 2 shows a preferable sequence of steps in some forms of the present disclosure. However, some steps may be eliminated from the flowchart or other some steps may be added to the flowchart if the elimination or the addition of the steps does not depart from the spirit of the present disclosure.

Steps to be described below are actually performed by the constituent elements of the resolver sensor management apparatus 100. However, for convenience of description, it will be described in a manner that the resolver sensor management apparatus 100 performs the steps herein below.

Referring to FIG. 2, a method of obtaining a valid peak from a resolver sensor 300 starts with a step in which a resolver sensor management apparatus 100 receives a square waveform control signal from an MCU 200 (S200). Since the functions and hardware features of the MCU 200 are described above, a detailed description of the MCU 200 will be omitted here. It is noted that although Step S200 is described herein to help an easy understanding of the present disclosure, this step may not be included in some forms of the present disclosure as defined in the appended claims.

After Step S200 is performed, the resolver sensor management apparatus 100 generates an excitation signal from the square waves and transmits the excitation signal to the resolver sensor 300 (S201). The excitation signal is a sine wave signal converted from the control signal (i.e., square wave signal). To convert the square waves into the sine waves, the resolver sensor management apparatus 100 includes a square wave-to-sine wave converter.

After Step S201 is performed, the resolver sensor management apparatus 100 receives a resolver signal from the resolver sensor 300 (S202). The resolver signal is a reflected signal of the excitation signal, and is generated through the modulation of the excitation signal in the solver sensor 300. The resolver signal has characteristics of a sine wave and/or a cosine wave.

After the resolver signal is received in Step S202, the resolver sensor management apparatus 100 takes a high peak and a low peak from the resolver signal (S203). The high peak and the low peak mean the highest value and the lowest value, respectively at respective certain time points on the assumption that the resolver signal is a sine wave signal or a cosine wave signal. The resolver sensor management apparatus 100 can identify time points (i.e., signal phases at the high peak and the low peak, respectively) at which the high peak and the low peak respectively appear. The resolver sensor management apparatus 100 can obtain signal values at the respective time points. That is, the highest signal value and the lowest signal value of the resolver signal can be obtained.

There are various techniques for the resolver sensor management apparatus 100 to obtain a high peak and a low peak from a resolver signal. In the description given below, it is assumed that a multi-threshold detection method is used to obtain an accurate peak value. The multi-threshold detection method will be described below with reference to FIG. 3.

Figure 3:
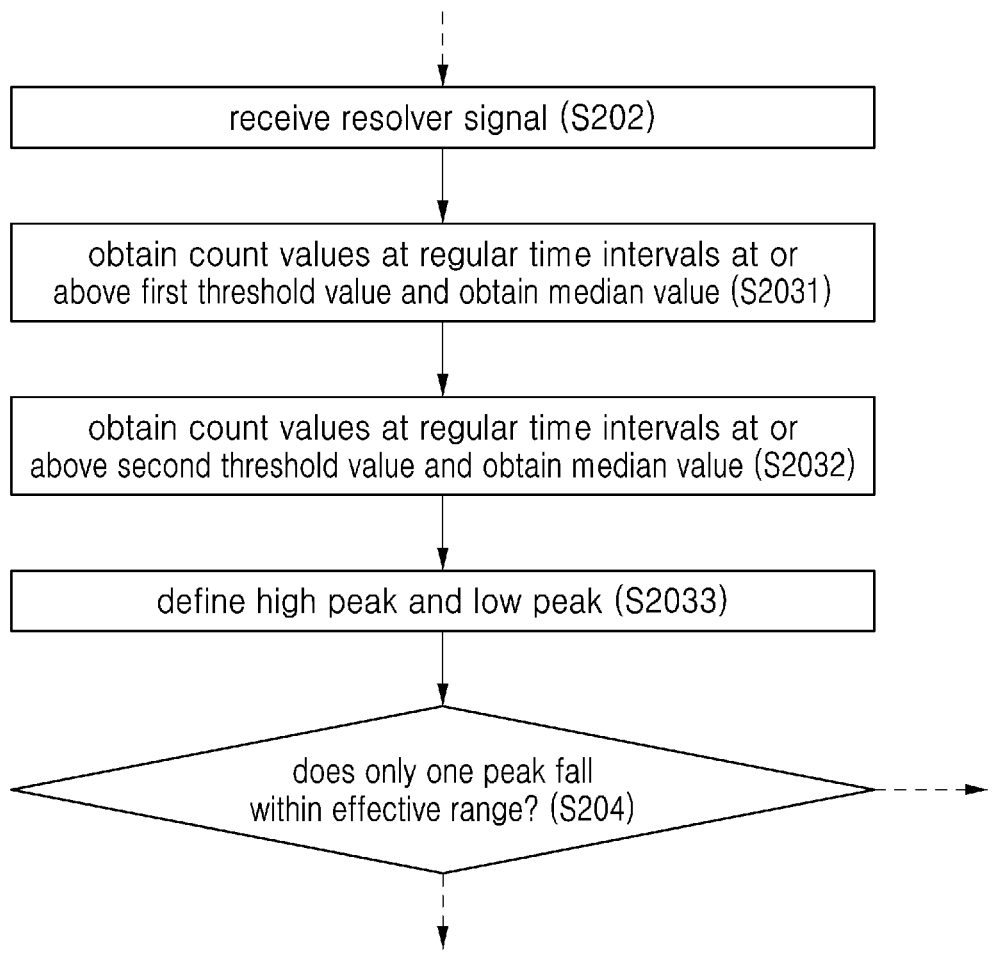
FIG. 3 is a flowchart illustrating a process of obtaining a high peak and a low peak of a resolver signal, using multiple threshold values.
Figure 4:
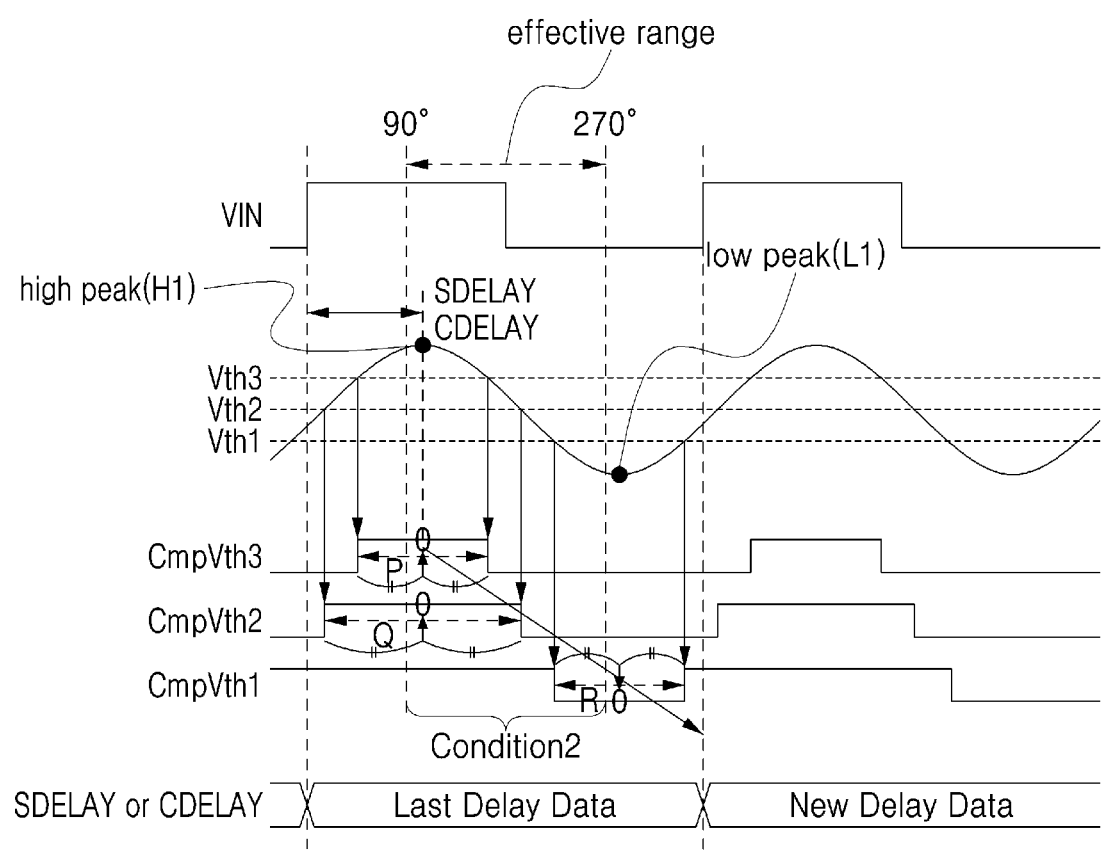
FIG. 4 is a graph illustrating a method of obtaining a valid peak of a resolver signal.

FIG. 3 illustrates sub-steps that may be performed between Step S202 and Step S204 of FIG. 2. Specifically, FIG. 3 illustrates a process of obtaining a high peak and a low peak using the multi-threshold detection method. FIG. 4 illustrates an actual resolver signal and multiple threshold values.

Referring to FIG. 3, after performing Step S202 at which the resolver signal is received, the resolver sensor management apparatus 100 obtains count values at each of which the resolver signal has a value equal to a first threshold value and calculates a median value between the count values (S2031). Specifically, referring to FIG. 4, Vth1, Vth2, and Vth3 designate respective threshold values, and CmpVth1, CmpVth2, and CmpVth3 designate time periods, each ranging from a time point of a first occurrence of a corresponding one of the threshold values Vth1, Vth2, and Vth3 to a time point of the next occurrence of the corresponding one.

For example, CmpVth3 rises at a first time point when the resolver signal first time has a value equal to the threshold value Vth3 and falls at a second time point when the resolver signal has the same value. Thus, a time period P from the first time point to the second time point is obtained.

In Step S2301, after the time period P is obtained, the value of the midpoint of the time period P is calculated to identify a time point at which the peak of the resolver signal has appeared. Referring to FIG. 4, a line segment corresponding to the time period P is equally divided, and a normal line (dotted vertical line) to a horizontal axis is drawn at the midpoint of the line segment. From FIG. 4, it is seen that the peak of the resolver signal is plotted on the normal line. That is, the time point at which the peak appears is coincident with the midpoint of the time period P. The graph of FIG. 4 illustrates an ideal resolver signal where the peak thereof appears at the midpoint of the time period P. However, in actual practice, there are many cases where a peak of a resolver signal does not appear at the midpoint of the corresponding time period.

The multi-threshold detection method is a method in which multiple threshold values are preset, time periods corresponding to the respective threshold values are obtained, and the midpoint of each of the time periods is calculated. The midpoint of each of the time periods is defined as a time point at which it is the most highly expected that a peak of a resolver signal appears. For example, referring to FIG. 4, a second threshold value Vth2, and a corresponding time period between a rising point and a falling point of CmpVth2 are shown. The second threshold value Vth2 is a value different from the third threshold value Vth3. The time period corresponding to the second threshold value Vth2 is designated by "Q". The time period Q also ranges from a rising point to a falling point of the resolver signal and is used to identify a time point at which a signal peak appears. As described above, the resolver sensor management apparatus 100 may preset multiple threshold values, obtain time points at each of which one of the threshold values is detected, calculate time periods corresponding to the respective threshold values, and calculate the midpoints of the respective time periods. All through these operations, it is possible to estimate an accurate time point at which a peak of a resolver signal occurs.

In summary, at Step S2031, it is possible to estimate a time point at which a peak of a resolver signal appears by calculating a time period (for example, P) corresponding to a certain threshold value (for example, Vth3), and the midpoint of the time period. Alternatively, one or more additional threshold values, each of which is different from the former one (Vth3), may be set, multiple time periods corresponding to the respective threshold values may be obtained, and the midpoints of the respective time periods may be calculated. In this case, it is possible to more accurately estimate a time point at which a peak of a resolver signal appears.

Alternatively, after Step S2031 is performed, substantially the same operation as Step S2031 may be performed but with a threshold value that is different from the one used in Step S2031. Thus, the next peak of the resolver signal and a time period associated with this peak may be obtained (S2032). Referring back to FIG. 4, at a time point when the resolver signal has a value equal to the threshold value Vth1, the timing signal CmpVth1 falls, and at a time point when the resolver signal has the same value again, the timing signal rises. Thus, a time period R ranging from the falling point to the rising point related to the threshold value Vth1 is obtained. Next, the midpoint of the time period R is calculated. Thus, it is possible to identify the time point at which the next peak appears.

The rising points and the falling points of the timing signals CmpVth3 and CmpVth1 on the graph can be differently represented depending on whether a sine wave or a cosine wave (i.e., resolver signal to be monitored) is a rising phase or a falling phase. The graphical representation of "rising" and "falling" is provided only to help ones easily distinguish a rising phase and a falling phase of a resolver signal. Therefore, a specific representation of a time period may vary depending on the configuration of an internal circuit.

After some peaks are taken through Step S2031 and Step S2032, each of the taken peaks may be determined as a high peak or a low peak (S2033). When a peak is taken in a rising phase in which the resolver signal first rises and then falls, the peak is determined as a high peak H1. On the contrary, when a peak is taken in a falling phase in which the resolver signal first falls and then rises, the peak is determined as a low peak L1.

The process of obtaining a high peak and a low peak from a resolver signal has been described in detail with reference to FIGS. 3 and 4. Specifically, a case of using the multi-threshold detection method to obtain a high peak and a low peak has been described.

Referring back to FIG. 2, after the high peak H1 and the low peak L1 are taken from the resolver signal in Step S203, the resolver sensor management apparatus 100 determines whether either one of the high peak H1 and the low peak L1 falls within an effective range (S204). The effective range is a signal phase range of from 90° to 270° of the excitation signal. In Step S204, it is specifically noted that only either one of the high peak H1 and the low peak L1 needs to fall within the effective range. That is, the resolver sensor management apparatus 100 invalidates both of the high peak H1 and the low peak L1 (S206) when both of the high peak H1 and the low peak L1 fall within the effective range. When only either one of the high peak H1 and the low peak L1 falls within the effective range, both of the peaks H1 and L1 are defined as valid peaks (S205). As such, when only one peak falls within the effective range, the peak is defined as a valid peak, and when both of two peaks fall within the effective range, the peaks are invalidated. Only the excitation signal within a range of 90° to 270° is regarded as an effective signal, when a normal sine or cosine wave is received, one peak surely appears in a period from 90° to 270°. Therefore, in some forms of the present disclosure, the effective range is set to a phase range of 90° to 270°.

Regarding Steps S203, S204, and S205, FIG. 4 shows that only the high peak H1 of the high peak H1 and the low peak L1 is included within the effective range. In this case, as described above, the resolver sensor management apparatus 100 defines the high peak H1 and the low peak L1 as valid peaks. That is, the high peak (H1) and the low peak (L1) shown in FIG. 4 appear in a sine wave of a normal shape, that is, a resolver signal having a distortion-free waveform. In the case of a resolver signal having a normal waveform, only one peak exists within a range of 90° to 270°. Therefore, the high peak and the low peak taken as peaks in FIG. 4 are defined as effective peaks.

Figure 5:
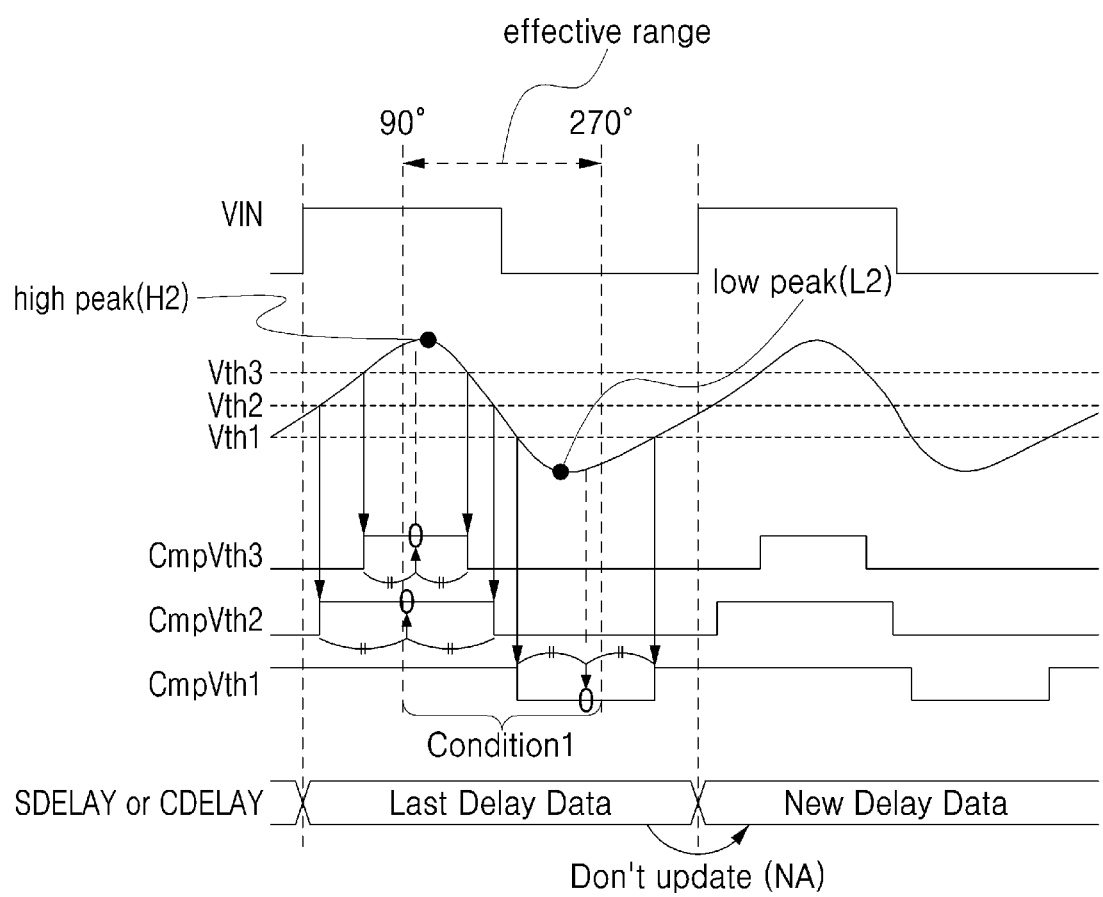
FIG. 5 is a graph illustrating a case where a calculated peak value is determined to be invalid.

FIG. 5 illustrates a case in which peaks acquired from a resolver signal are invalidated. Referring to FIG. 5, when a high peak H2 and a low peak L2 are acquired through Steps S201 to S203, the resolver sensor management apparatus 100 determines whether only either one of the high peak H2 and the low peak L2 is within the effective range (90° to 270°). In FIG. 5, since both of the high peak H2 and the low peak L2 are included in the effective range, the resolver sensor management apparatus 100 invalidates all the acquired peaks. When the acquired peaks are invalidated as shown in FIG. 5, the resolver sensor management apparatus 100 will not provide any information to the MCU 200 for the previous resolver signal. Next, the resolver sensor management apparatus 100 performs the steps shown in FIGS. 2 and 3 on a newly incoming resolver signal, and continuously provides information on a signal delay to the MCU 200.

On the other hand, the method of obtaining a valid peak of a resolver signal output from the resolver sensor 300, in some forms of the present disclosure, may be performed through the steps up to Step S205 described above. Although FIG. 2 shows only these steps, it should be understood that the method in some forms of the present disclosure can further include a step of transmitting information on the obtained peaks to the MCU 200. Specifically, after Step S205 is performed, when valid peaks are defined due to the fact that only one of a high peak and a low peak falls within the effective range, the resolver sensor management apparatus 100 may determine which value is referred to and may transmit information on the high peak and the low peak to the MCU 200. In addition, when the resolver sensor management apparatus 100 receives both a sine save resolver signal and a cosine wave resolver signal and determines that a high peak and a low peak for the sine wave resolver signal and a high peak and a low peak for the cosine wave resolver signal are effective peaks, the resolver sensor management apparatus 100 may transmit one of four phase states "high-high", "high-low", "low-low", and "low-high" to the MCU 200.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of obtaining a valid peak of an output signal of a resolver sensor, the method comprising:
inputting an excitation signal to a resolver sensor;
receiving a resolver signal from the resolver sensor;
receiving a high peak and a low peak from the received resolver signal;
determining whether the high peak or the low peak falls within an effective range; and defining the high peak or the low peak as a valid peak when only one of the high peak or the low peak falls within the effective range and invalidating both of the high peak and the low peak when both of the high peak and the low peak fall within the effective range.

2. The method according to claim 1, wherein the receiving a high peak and a low peak comprises:
obtaining a count value of a plurality of count values at each time point when a value of the received resolver signal is equal to a first preset threshold value; and
calculating a first median value of the plurality of count values.

3. The method according to claim 2, wherein the receiving a high peak and a low peak further comprises:
obtaining a count value of the plurality of count values at each time point when the value of the received resolver signal is equal to a second preset threshold value and is different from the first preset threshold value; and
obtaining a second median value of the plurality of count values.

4. The method according to claim 3, wherein the receiving a high peak and a low peak further comprises:
defining a resolver signal value measured at a time point corresponding to the first median value and a resolver signal value measured at a time point corresponding to the second median value as the high peak and the low peak or vice versa.

5. The method according to claim 4, wherein the receiving a high peak and a low peak further comprises:
invalidating a previously detected resolver signal value when there is no time point at which the resolver signal has a value equal to the first preset threshold value or the second preset threshold value.

6. The method according to claim 1, wherein the determining whether the high peak or the low peak falls within the effective range comprises:
defining the effective range as a phase range of from 90° to 270° of the excitation signal.

7. The method according to claim 1, wherein the excitation signal is a sine wave signal.

8. A resolver sensor management apparatus comprising:
a signal generator configured to:
receive a square wave signal from a micro controller unit (MCU);
generate an excitation signal including a sine wave; and
input the excitation signal to a resolver sensor;
a signal receiver configured to receive a resolver signal from the resolver sensor; and
a processor configured to:
receive a high peak and a low peak from the received resolver signal; and
determine the high peak or the low peak as a valid peak when only one of the high peak or the low peak falls within an effective range and invalidate both of the high peak and the low peak when both of the high peak and the low peak fall within the effective range.

9. A non-transitory computer-readable recording medium having a program recorded thereon, the program to direct a processor to perform acts of:
inputting an excitation signal to a resolver sensor;
receiving a resolver signal from the resolver sensor;
receiving a high peak and a low peak from the received resolver signal;
determining whether the high peak or the low peak falls within an effective range; and
defining the high peak or the low peak as a valid peak when only one of the high peak or the low peak falls within the effective range and invalidating both of the high peak and the low peak when both of the high peak and the low peak fall within the effective range.

* * * * *